United States Patent
Han et al.

(10) Patent No.: US 12,437,229 B1
(45) Date of Patent: Oct. 7, 2025

(54) SYSTEMS AND METHODS FOR UPDATING A MACHINE-LEARNING-BASED PREDICTION MODEL WITH PRESERVED PRIVACY

(71) Applicant: GEN DIGITAL INC., Tempe, AZ (US)

(72) Inventors: Yufei Han, Antibes (FR); Chris Gates, Mountain View, CA (US)

(73) Assignee: Gen Digital Inc., Tempe, AZ (US)

(*) Notice: Subject to any disclaimer, the term of this patent is extended or adjusted under 35 U.S.C. 154(b) by 1130 days.

(21) Appl. No.: 16/907,073

(22) Filed: Jun. 19, 2020

(51) Int. Cl.
*G06N 20/00* (2019.01)
*G06F 18/20* (2023.01)
*G06F 18/26* (2023.01)
*G06F 21/57* (2013.01)

(52) U.S. Cl.
CPC .............. *G06N 20/00* (2019.01); *G06F 18/26* (2023.01); *G06F 18/285* (2023.01); *G06F 21/57* (2013.01)

(58) Field of Classification Search
CPC ...... G06N 3/098; G06N 3/0985; G06N 20/00; G06F 18/00; G06F 18/285; G06F 21/57; G06F 18/26

See application file for complete search history.

(56) References Cited

U.S. PATENT DOCUMENTS

| | | | |
|---|---|---|---|
| 11,341,429 B1* | 5/2022 | Pihur | G06N 5/04 |
| 11,429,813 B1* | 8/2022 | Aghoram Ravichandran | G06N 3/045 |
| 2015/0373043 A1* | 12/2015 | Wang | G06F 21/6254 706/12 |
| 2020/0057958 A1* | 2/2020 | Moore | G06N 20/00 |
| 2020/0175374 A1* | 6/2020 | Hestness | G06N 3/047 |
| 2020/0285980 A1* | 9/2020 | Sharad | G06F 21/6245 |
| 2021/0365841 A1* | 11/2021 | Shaloudegi | G06N 20/20 |
| 2022/0197264 A1* | 6/2022 | Onvlee | G06N 3/08 |
| 2023/0019669 A1* | 1/2023 | Alabbasi | G06N 3/045 |

OTHER PUBLICATIONS

Bengio et al., "Curriculum Learning", Proceedings of the 26th International Conference on Machine Learning, 2009, pp. 41-48.

(Continued)

*Primary Examiner* — Markus A. Vasquez
(74) *Attorney, Agent, or Firm* — Greenberg Traurig, LLP

(57) ABSTRACT

The disclosed computer-implemented method for updating a machine-learning-based prediction model with preserved privacy may include receiving a plurality of training data sets for training a machine-learning-based global prediction model for predicting future incidents of a computing event. Each data set may include incidents of the computing event. The method may include creating, by training the global prediction model using the plurality of training data sets, an intermediate prediction model of the global prediction model. The intermediate prediction model may be a precursor state to a fully trained global prediction model. The method may further include providing the intermediate prediction model to a computing node to enable the computing node to fully train a local prediction model using both the intermediate prediction model and a local training data set. Various other methods, systems, and computer-readable media are also disclosed.

20 Claims, 7 Drawing Sheets

(56) References Cited

OTHER PUBLICATIONS

Bartunov et al., "Few-shot Generative Modeling with Generative Matching Networks", Proceedings of the 21th International Conference on Artificial Intelligence and Statistics, PMLR: vol. 84, 2018, 9 pages.
Bengio et al., "On the Optimization of a Synaptic Learning Rule", Optimality in Artificial and Biological Neural Networks, 1992, pp. 1-29.
Finn et al., "Model-Agnostic Meta-Learning for Fast Adaptation of Deep Networks", Proceedings of the 34th International Conference on Machine Learning, PMLR 70, 2017, 13 pages.
Grant et al., "Recasting Gradient-Based Meta-Learning as Hierarchical Bayes", International Conference on Learning Representations, 2018, pp. 1-13.
Franceschi et al., "Bilevel Programming for Hyperparameter Optimization and Meta-Learning", International Conference on Learning Representations, 2018, 12 pages.
Lee et al., "Gradient-Based Meta-Learning with Learned Layerwise Metric and Subspace", International Conference on Machine Learning, 2018, 13 pages.
Fei-Fei et al., "One-Shot Learning of Object Categories", IEEE Transactions on Pattern Analysis and Machine Intelligence, vol. 28, No. 4, Apr. 2006, pp. 594-611.
Li et al., "Meta-SGD: Learning to Learn Quickly for Few-shot Learning", International Conference on Machine Learning, 2018, pp. 1-11.
Munkhdalai et al., "Meta Networks", International Conference on Machine Learning, 2017, 11 pages.

\* cited by examiner

SYSTEMS AND METHODS FOR UPDATING A MACHINE-LEARNING-BASED PREDICTION MODEL WITH PRESERVED PRIVACY

BACKGROUND

Artificial intelligence, and more specifically machine learning, may provide tools for analyzing data. For example, a machine-learning-based prediction model may be able to classify data. For computer security, a machine-learning-based prediction model may be able to identify potential security threats on user devices. To build the prediction models, machine learning algorithms may require training data. To effectively build a prediction model for computer security, for example, machine learning algorithms may require actual user data that may include incidents of computer security threats. Thus, training the prediction model may require users to send their private data to a centralized server in order to seed the training. For example, various user devices may subscribe to a security service from a centralized server. The subscribing devices may be able to trust the centralized server and send their private data. However, a potential new subscriber may not wish to send private data before testing the effectiveness of the prediction model.

Federated machine learning (FML) may be used to decentralize the training process. With FML, each user device may locally train their own local prediction model with their own local data without requiring users to first upload their data. The user devices may upload their local prediction models to a centralized server that may then aggregate the local prediction models to a global prediction model. The user devices may retrieve the global prediction model for local use. In the computer security example, the subscribing devices may receive software from the centralized server to locally train local prediction models. The subscribing devices may then upload the local prediction models to the centralized server, and subsequently receive a global prediction model that is an aggregate of the subscribing users' local prediction models. Thus, a potential subscriber may be able to locally train its own local prediction model to test without needing to send its private data.

However, FML may suffer from issues of scalability or may otherwise not be easily extendable. For example, if a new device, such as a new subscriber or a potential subscriber, joins the service network, the existing global prediction model may not be effective for the new device because the new device may have a different data profile than the other devices already in the service network. The global prediction model may require updating to address the different data profile. As the number of devices in the service network expands, updating the global prediction model may be increasingly difficult. For example, retraining the global prediction model may require coordinated retraining on each subscribing device. If a new device triggers retraining, the global prediction model may be biased towards the new device's data profile until the other devices upload their retrained local prediction models. As the new device's data profile may be different from that of the other devices, the global prediction model's effectiveness may be reduced with respect to the other devices.

In addition, training the local prediction models may be time consuming and resource intensive, particularly for client devices that are not configured for running machine learning algorithms. Although new subscribing devices may be willing to allocate the resources for local training, a potential subscribing device may not wish to allocate such resources in order to test or otherwise trial the prediction model.

The present disclosure, therefore, identifies and addresses a need for systems and methods for updating a machine-learning-based prediction model with preserved privacy.

SUMMARY

As will be described in greater detail below, the present disclosure describes various systems and methods for updating a machine-learning-based prediction model with preserved privacy.

In one example, a method for updating a machine-learning-based prediction model with preserved privacy may include (i) receiving a plurality of training data sets, with each data set including incidents of a computing event, for training a machine-learning-based global prediction model for predicting future incidents of the computing event, (ii) creating, by training the global prediction model using the plurality of training data sets, an intermediate prediction model of the global prediction model, wherein the intermediate prediction model corresponds to a precursor state associated with fully training the global prediction model, and (iii) providing the intermediate prediction model to a computing node to enable the computing node to fully train a local prediction model using both the intermediate prediction model and a local training data set.

In some examples, the method fully training the global prediction model may include training the global prediction model until a model parameter reaches a convergence point such that the intermediate prediction model corresponds to the precursor state prior to the model parameter reaching the convergence point.

In some examples, the method may further include training a plurality of intermediate prediction models, wherein each of the plurality of intermediate prediction models corresponds to a distinct precursor state of the global prediction model. In some examples, providing the intermediate prediction model to the computing node may further include selecting the intermediate prediction model from the plurality of intermediate prediction models. In some examples, selecting the intermediate prediction model may be based on a size of the local training data set.

In some examples, the plurality of intermediate prediction models may include a coarse intermediate prediction model corresponding to a first precursor state of the global prediction model and a fine intermediate prediction model corresponding to a second precursor state of the global prediction model, wherein the first precursor state precedes the second precursor state. In some examples, providing the intermediate prediction model to the computing node may include providing the coarse intermediate prediction model for a small training data set and providing the fine intermediate prediction model for a large local training data set, wherein the large local training data set is larger than the small training data set.

In some examples, the method may include providing the plurality of intermediate prediction models to the computing node. In some examples, the intermediate prediction model may correspond to a stable prediction model. In some examples, the computing event may correspond to a computer security threat.

In one embodiment, a system for updating a machine-learning-based prediction model with preserved privacy may include at least one physical processor and physical memory that includes computer-executable instructions that, when executed by the physical processor, cause the physical processor to (i) receive a plurality of training data sets, with each data set including incidents of a computing event, for training a machine-learning-based global prediction model for predicting future incidents of the computing event, (ii) create, by training the global prediction model using the plurality of training data sets, an intermediate prediction model of the global prediction model, wherein the intermediate prediction model corresponds to a precursor state associated with fully training the global prediction model, and (iii) provide the intermediate prediction model to a computing node to enable the computing node to fully train a local prediction model using both the intermediate prediction model and a local training data set.

In some examples, fully training the global prediction model may include training the global prediction model until a model parameter reaches a convergence point such that the intermediate prediction model corresponds to the precursor state prior to the model parameter reaching the convergence point. In some examples, the instructions may further include instructions for training a plurality of intermediate prediction models, wherein each of the plurality of intermediate prediction models corresponds to a distinct precursor state of the global prediction model. In some examples, providing the intermediate prediction model to the computing node may further include instructions for selecting the intermediate prediction model from the plurality of intermediate prediction models. In some examples, selecting the intermediate prediction model may be based on a size of the local training data set. In some examples, the instructions may further include instructions for providing the plurality of intermediate prediction models to the computing node.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a plurality of training data sets, with each data set including incidents of a computing event, for training a machine-learning-based global prediction model for predicting future incidents of the computing event, (ii) create, by training the global prediction model using the plurality of training data sets, an intermediate prediction model of the global prediction model, wherein the intermediate prediction model corresponds to a precursor state associated with fully training the global prediction model, and (iii) provide the intermediate prediction model to a computing node to enable the computing node to fully train a local prediction model using both the intermediate prediction model and a local training data set.

In some examples, fully training the global prediction model may include training the global prediction model until a model parameter reaches a convergence point such that the intermediate prediction model corresponds to the precursor state prior to the model parameter reaching the convergence point.

In some examples, the computer-readable medium may further cause the computing device to train a plurality of intermediate prediction models, wherein each of the plurality of intermediate prediction models corresponds to a distinct precursor state of the global prediction model, and the plurality of intermediate prediction models includes a coarse intermediate prediction model corresponding to a first precursor state of the global prediction model and a fine intermediate prediction model corresponding to a second precursor state of the global prediction model, wherein the first precursor state precedes the second precursor state.

In some examples, providing the intermediate prediction model to the computing node may include providing the coarse intermediate prediction model for a small training data set and providing the fine intermediate prediction model for a large local training data set, wherein the large local training data set is larger than the small training data set.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
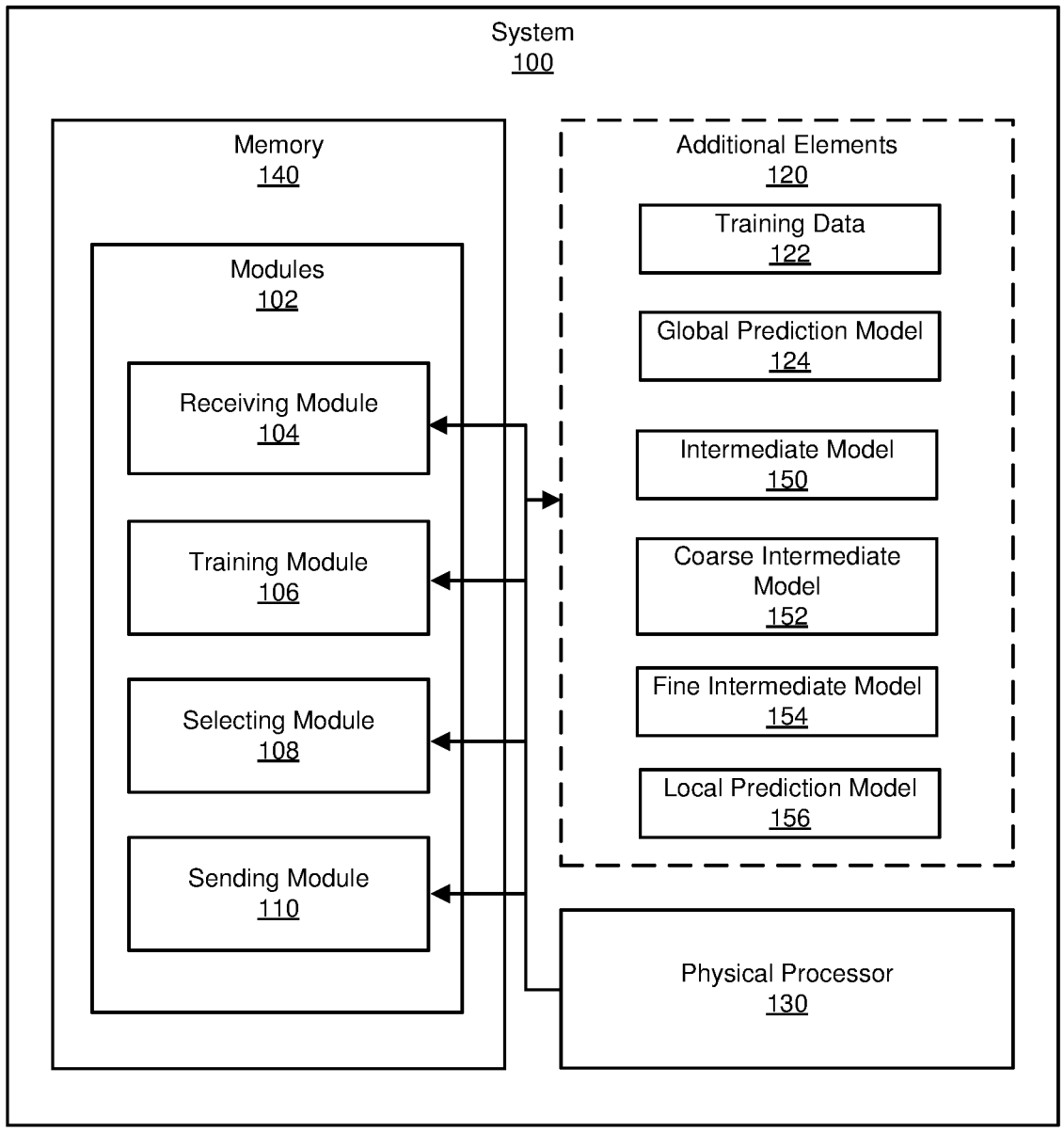
FIG. 1 is a block diagram of an example system for updating a machine-learning-based prediction model with preserved privacy.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for updating a machine-learning-based prediction model with preserved privacy. Subscribers in a service network of a computer service, such as computer security, may be comfortable with uploading their data to the service's servers to improve the service. For example, subscribers may upload their data to a centralized server to train a global prediction model that the subscribers may use to predict future incidents of computer security threats. However, because the global prediction model requires training data, a prospective subscriber may need to upload their potentially private data in order to properly train and test the global prediction model. The systems and methods described herein may allow a prospective subscriber to properly test a local version of the global prediction model without needing to upload their data.

As will be explained in greater detail below, by training a global prediction model to a precursor state, the systems and methods described herein may create an intermediate model which may be used to efficiently train a local prediction model with local data on a computing device without needing to send the local data to a centralized server. By utilizing the intermediate model in this way, the systems and methods described herein may improve the classification accuracy of the local prediction model, tailored to the local data, while preserving privacy of the local data when compared to conventional models which require either sending data to a centralized server or locally training a model without the data and resources available to the centralized server.

In addition, the systems and methods described herein may improve the functioning of a computing device by improving the prediction accuracy of a local prediction model, reducing the transferring of data, and preserving the privacy of data. These systems and methods may also improve the field of federated machine learning (FML) by enabling an FML scheme that may preserve data privacy.

Figure 2:
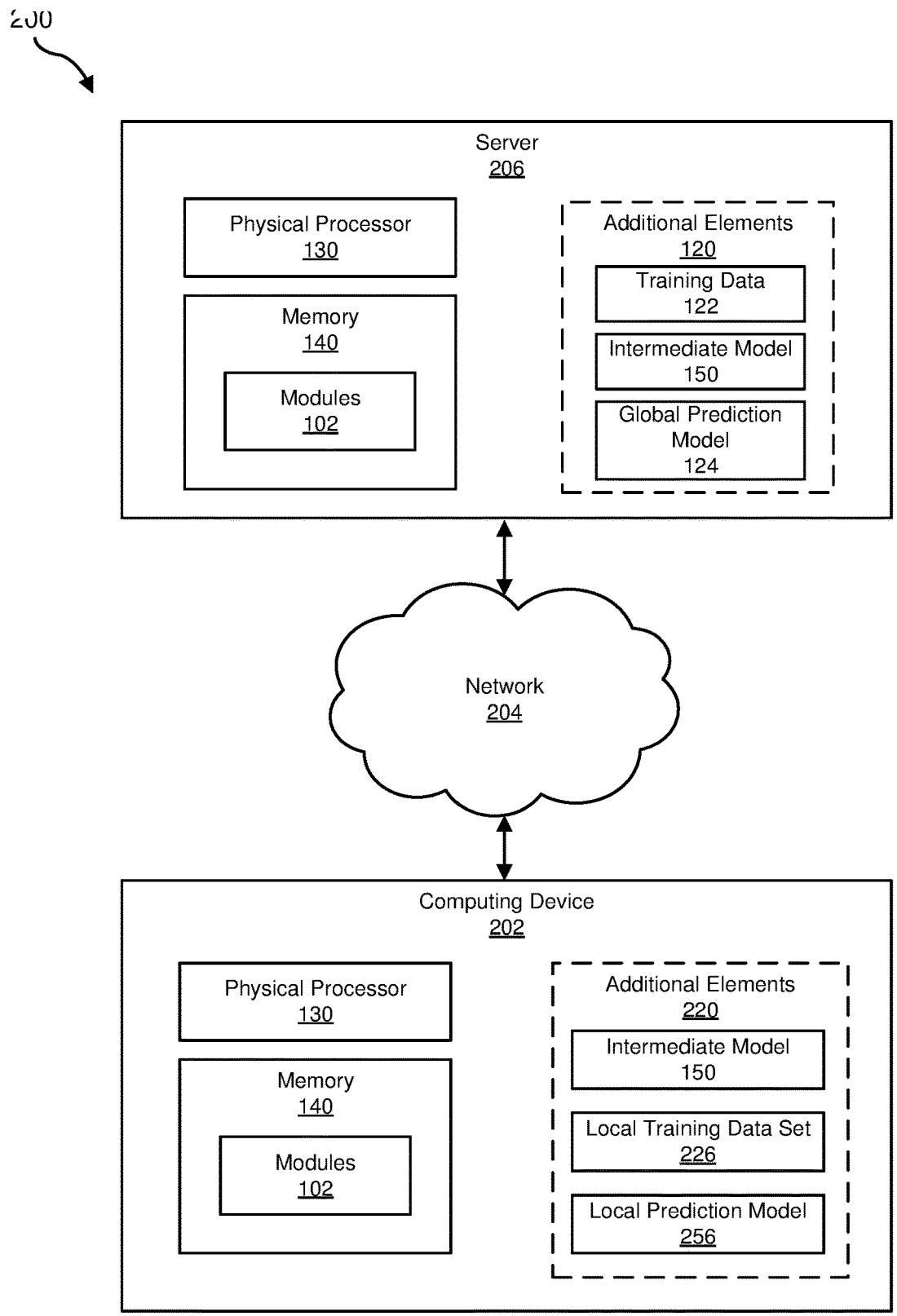
FIG. 2 is a block diagram of an additional example system for updating a machine-learning-based prediction model with preserved privacy.

The following will provide, with reference to FIGS. 1-2, detailed descriptions of example systems for updating a machine-learning-based prediction model with preserved privacy. Detailed descriptions of corresponding computer-implemented methods will also be provided in connection with FIG. 3. Detailed descriptions of a data flow will be provided in connection with FIG. 4. Detailed descriptions of a training timeline will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for updating a machine-learning-based prediction model with preserved privacy. As illustrated in this figure, example system 100 may include one or more modules 102 for performing one or more tasks. As will be explained in greater detail below, modules 102 may include a receiving module 104, a training module 106, a selecting module 108, and a sending module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate updating a machine-learning-based prediction model with preserved privacy. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as training data 122, a global prediction model 124, an intermediate model 150, a coarse intermediate model 152, a fine intermediate model 154, and a local prediction model 156. Additional elements 120 generally represents any type or form of data and/or machine learning models. Training data 122 may include, for instance, files, logs, records, and/or other types of data that include instances of computing events. Training data 122 may be used for training global prediction model 124 for predicting future instances of the computing events. Global prediction model 124 may be a machine-learning model trained to predict future instances of the computing events. For example, global prediction model 124 may be provided a stream of data and predict when the computing events may occur. Additionally or alternatively, global prediction model 124 may be trained to recognize, identify, or otherwise classify instances of the computing event. For example, global prediction model 124 may be provided a target data set and recognize incidents of the computing event within the target data set. Local prediction model 156 may be a machine-learning model trained to predict future instances of the computing events, similar to global prediction model 124. Local prediction model 156 may be trained, in part, using training data 122 but may also be trained, in part, with a different training data set, as will be described further below. Intermediate model 150, coarse intermediate model 152, and fine intermediate model 154 may be machine-learning prediction models corresponding to various precursor states of global prediction model 124 and/or local prediction model 156 prior to being fully trained, as will be described further below.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to update a machine-learning prediction model while preserving privacy. For example, and as will be described in greater detail below, one or more of modules 102 may cause computing device 202 and/or server 206 to receive a plurality of training data sets, create an intermediate prediction model, and provide the intermediate prediction model.

Computing device 202 generally represents any type or form of computing device capable of reading computer-executable instructions. Computing device 202 may be an endpoint device running client-side security software, or a client server providing security support to various client devices. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of training a global prediction model for predicting computing events. Server 206 may be a security server providing security support to various client devices. Additional examples of server 206 include, without limitation, distributed security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Additional elements 220 generally represents any type or form of computer data and/or machine-learning models. Local training data set 226 may be training data, similar to training data 122, which may include instances of the computing event. Local training data set 226 may be local to computing device 202 such that local training data set 226 may not be sent to server 206. Computing device 202 may train local prediction model 256 using intermediate model 150 and local training data set 226.

Figure 3:
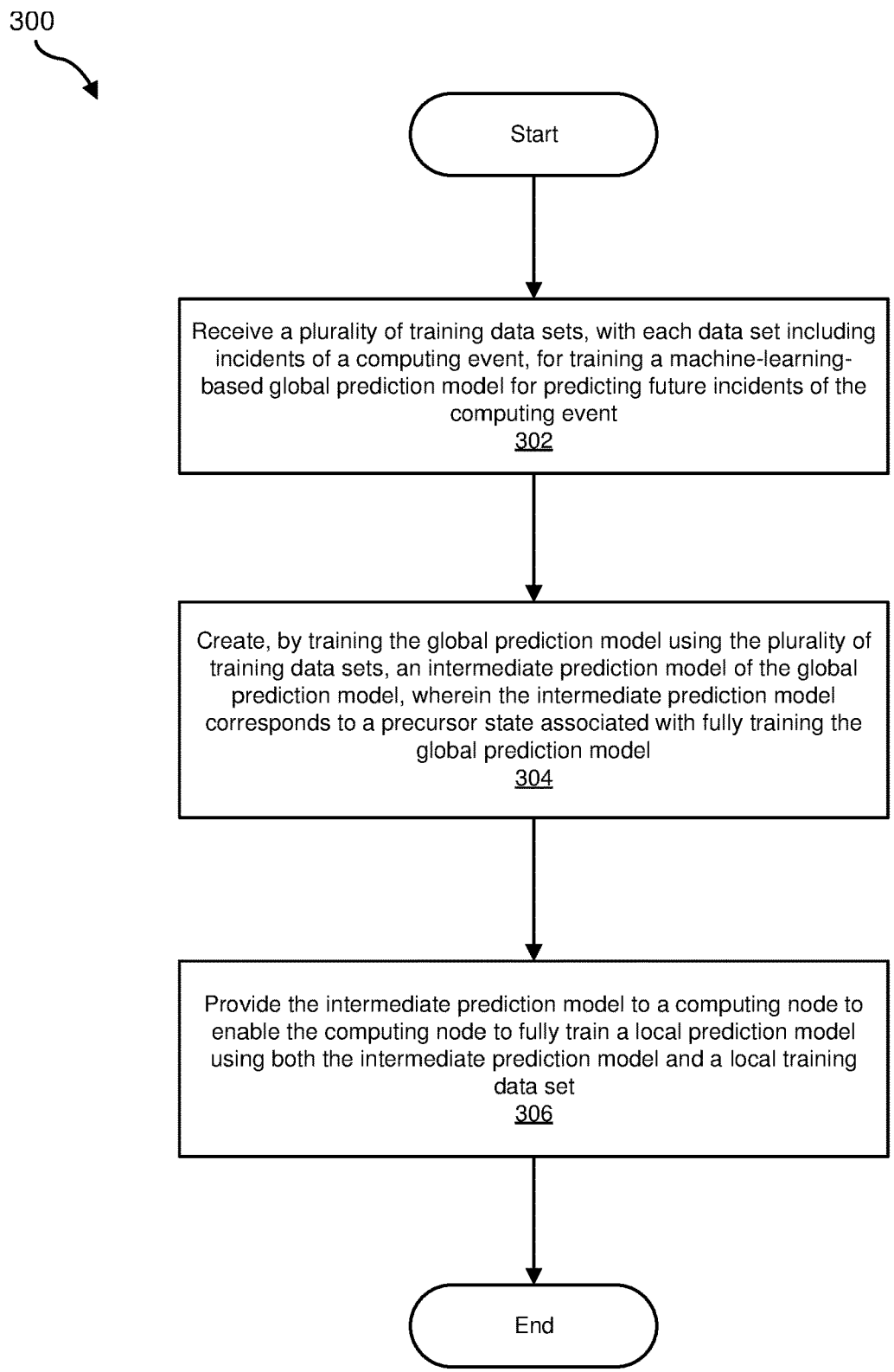
FIG. 3 is a flow diagram of an example method for updating a machine-learning-based prediction model with preserved privacy.

FIG. 3 is a flow diagram of an example computer-implemented method 300 for updating a machine-learning-based prediction model with preserved privacy. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a plurality of training data sets, with each data set including incidents of a computing event, for training a machine-learning-based global prediction model for predicting future incidents of the computing event. For example, receiving module 104 may, as part of server 206 in FIG. 2, receive training data 122.

The term "computing event," as used herein, generally refers to identifiable aspects of computer data. Examples of computing events include, without limitation, patterns in data, types of data, access to data, data operations, interactions that may be represented, logged, or otherwise recorded with data, etc. In some examples, computing events may correspond to computer security threats, such as malware files and/or file patterns, security breaches and/or conditions allowing security breaches, network communications with unauthorized devices, etc.

The systems described herein may perform step 302 in a variety of ways. In one example, server 206 may be a security server providing security software services to various client devices. The client devices, which may be similar to computing device 202, may each provide their own data, such as files, logs, records, etc., as training data 122 to server 206. Training data 122 may include incidents of computing events, such as malware, security breaches, and other computer security threats, from each of the various client devices. Server 206 may provide security services that may aid in preventing future computer security threats. For example, server 206 may provide predictive analysis to the client devices for identifying potential computer security threats.

Figure 4:
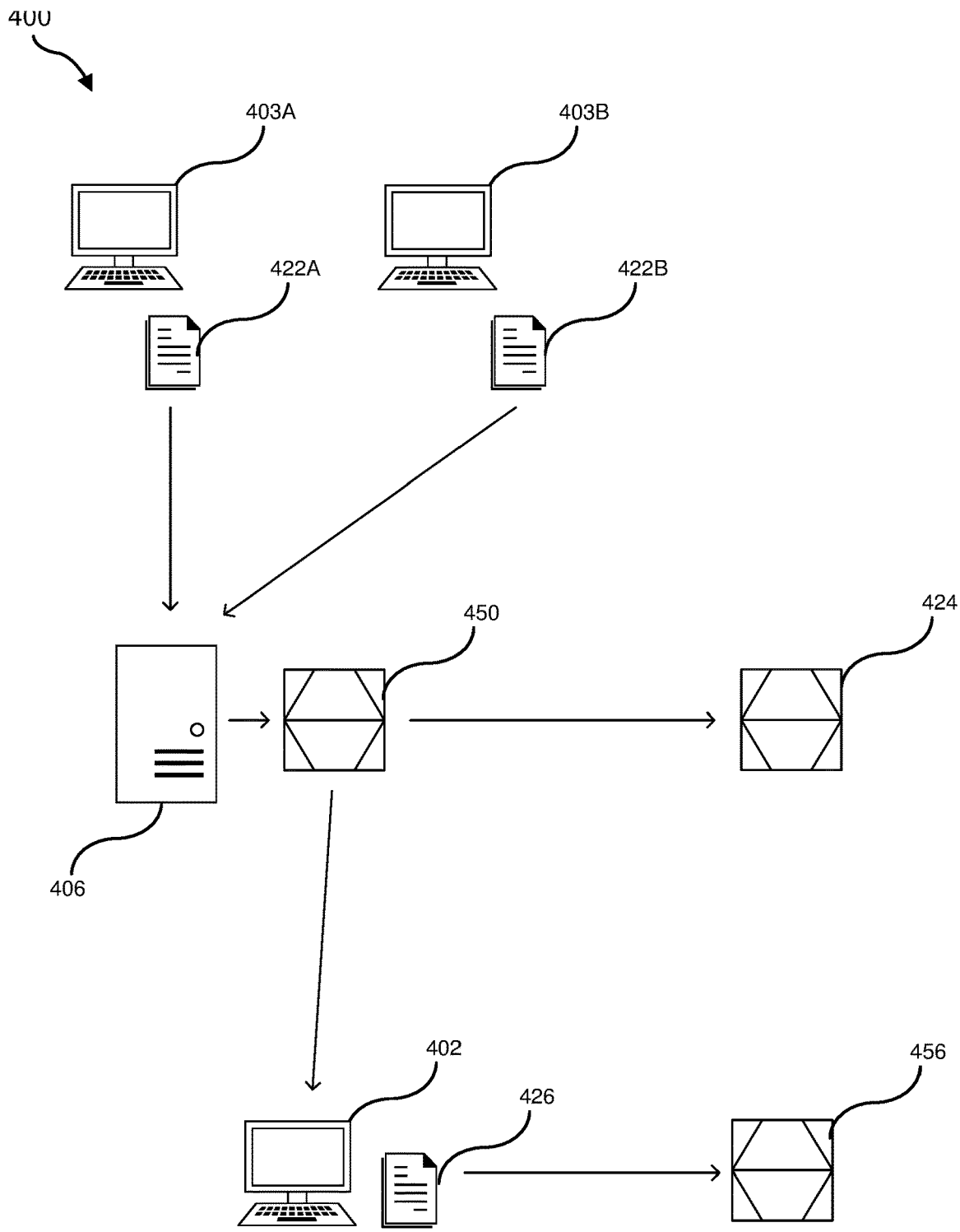
FIG. 4 is a diagram of an example data flow for updating a machine-learning-based prediction model with preserved privacy.

The client devices may provide training data 122 to server 206 to create, train, retrain, or otherwise update global prediction model 124. FIG. 4 illustrates a diagram 400 of client devices 403A-B, which may be similar to computing device 202, and a server 406, which may correspond to server 206. Server 406 may provide security services to client devices 403A-B, which may be subscribers in a service network of server 406. Client devices 403A-B may provide their respective training data 422A-B to server 406 for training a global prediction model 424, which may correspond to global prediction model 124. In some examples, server 406 may initially request training data from client devices 403A-B. For instance, server 406 may, as part of a scheduled retraining of global prediction model 424, request the training data. Training global prediction model 424 may alternatively be triggered by other circumstances, such as part of a service upgrade, addition of new devices to the service network, administrative reasons, identification of a new type of security threat, etc.

Returning to FIG. 3, at step 304 one or more of the systems described herein may create, by training the global prediction model using the plurality of training data sets, an intermediate prediction model of the global prediction model, where the intermediate prediction model corresponds to a precursor state associated with fully training the global prediction model. For example, training module 106 may, as part of server 206 in FIG. 2, initiate training of global prediction model 124, using training data 122, to create intermediate model 150.

The term "machine learning," as used herein, generally refers to an artificial intelligence scheme in which algorithms build a mathematical model based on sample data, or training data. The mathematical model may make predictions or decisions without requiring explicit programming. Examples of machine learning include, without limitation, artificial neural networks, deep neural networks, decision trees, Bayesian networks, etc.

The systems described herein may perform step 304 in a variety of ways. In one example, server 206 may use one or more machine learning algorithms to train global prediction model 124. Global prediction model 124 may be realized when it is fully trained. The fully trained global prediction model 124 may be deployed and used without requiring further training based on the current training data 122. For instance, server 206 may train global prediction model 124 until a model parameter, which may be associated with the one or more machine learning algorithms, reaches a convergence point. For example, the model parameter may correspond to a loss value that correlates to minimizing an error value. When the loss value moves toward a local or global minima with a decreasing trend, the model parameter may have reached the convergence point. However, in other examples, the convergence point of the model parameter may correspond to a measurable performance threshold when training may stop.

Figure 5:
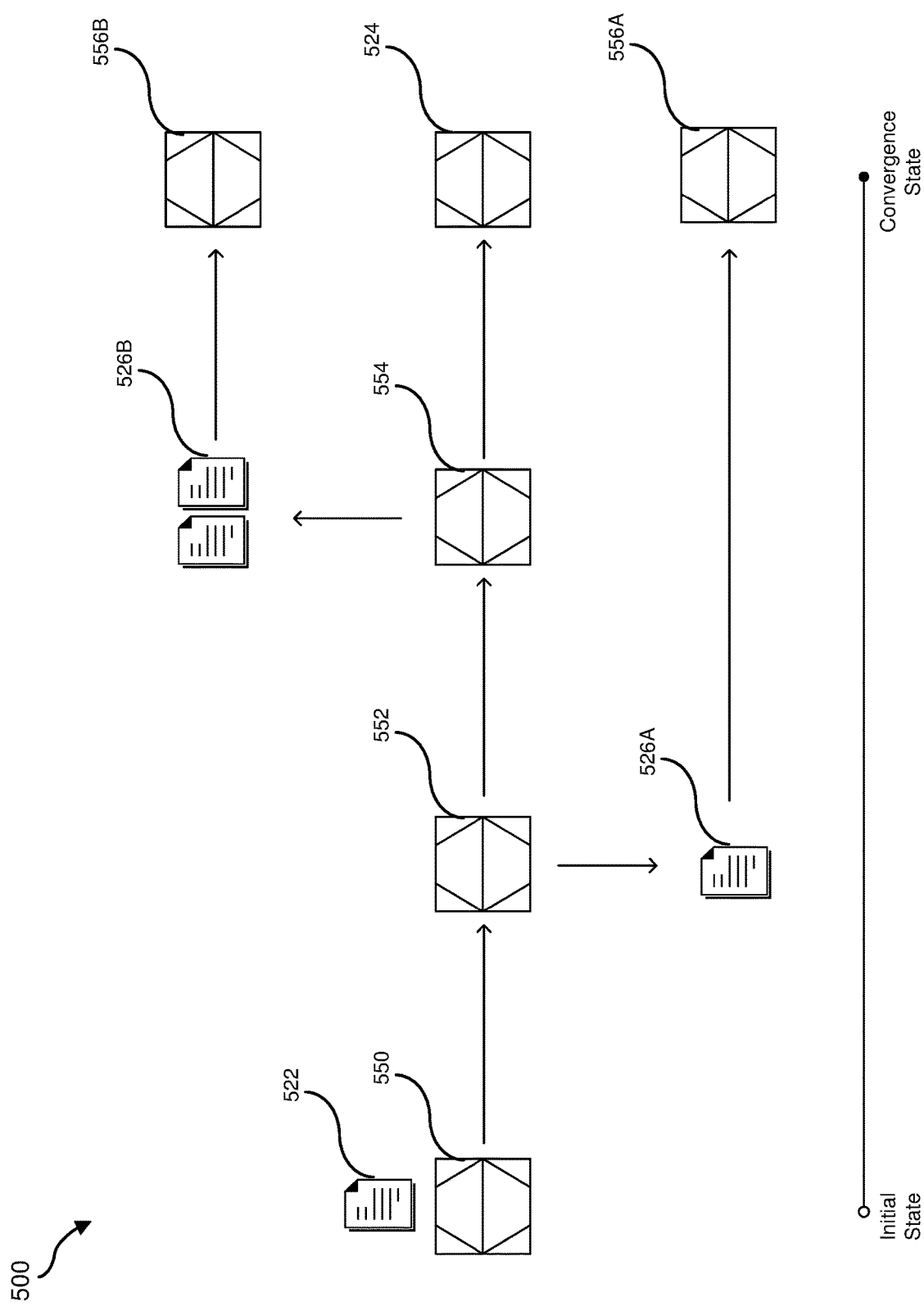
FIG. 5 is a diagram of an example timeline for updating a machine-learning-based prediction model with preserved privacy.

FIG. 5 illustrates a diagram 500 of a training progression from an initial state to a convergence state. The initial state may correspond to any training state of a prediction model prior to being fully trained. The convergence state may correspond to a state of a fully trained prediction model. For example, the convergence state may correspond to when an associated model parameter reaches a convergence point as described herein. FIG. 5 may not be illustrated with respect to any time scale but rather illustrates the relationships between states of training.

FIG. 5 illustrates a global prediction model 524 as well as various precursor states for global prediction model 524. Global prediction model may correspond to global prediction model 124 and/or global prediction model 424. The precursor states may correspond to partially trained states of global prediction model 524 prior to being fully trained (e.g., reaching the convergence point). The precursor states may include an intermediate model 550, a coarse intermediate model 552, and a fine intermediate model 554. Intermediate model 550 may correspond to intermediate model 150 and/or intermediate model 450. Coarse intermediate model 552 may correspond to coarse intermediate model 152. Fine intermediate model 554 may correspond to fine intermediate model 154.

Global prediction model 524 may be trained using training data 522, which may correspond to training data 122 and/or training data 422A-B. For instance, server 206 and/or server 406 may create intermediate model 550 as a precursor state to the fully trained global prediction model 524. In some examples, server 206 and/or server 406 may create multiple intermediate prediction models, each corresponding to a distinct precursor state of global prediction model 524. For instance, as depicted in FIG. 5, coarse intermediate model 552 may correspond to a precursor state preceding a precursor state of fine intermediate model 554. Because the precursor states are achieved during the progression to the convergence state, saving the precursor states as intermediate models may not require additional processing and/or training other than the overhead required for preserving the precursor states.

In some examples, the various precursor states may correspond to an amount of bias from training data 522. For instance, coarse intermediate model 552 may be less biased to training data 522 than fine intermediate model 554. In other words, any predictive and/or analytical output of coarse intermediate model 552 may be less expectative or otherwise conforming to training data 522 than that of fine intermediate model 554. In this regard, global prediction model 524 may be more biased to training data 522 than its precursor states (e.g., intermediate model 550, coarse intermediate model 552, fine intermediate model 554).

In some examples, the intermediate models (e.g., intermediate model 150, coarse intermediate model 152, fine intermediate model 154, intermediate model 450, intermediate model 550, coarse intermediate model 552, and/or fine intermediate model 554) may be stable prediction models that may be used for analyzing data without further training. In other examples, the intermediate models may require further training to be usable.

Turning back to FIG. 3, at step 306 one or more of the systems described herein may provide the intermediate prediction model to a computing node to enable the computing node to fully train a local prediction model using both the intermediate prediction model and a local training data set. For example, sending module 110 may, as part of server 206 in FIG. 2, send intermediate model 150 to computing device 202. Computing device 202 may locally train local prediction model 256, which may correspond to local prediction model 156, using intermediate model 150 and local training data set 226.

The systems described herein may perform step 306 in a variety of ways. In one example, computing device 202 may be a prospective user of the security services provided by server 206. Server 206 may send intermediate model 150 to computing device 202 with additional software and/or data to enable computing device 202 to fully train local prediction model 256. In some examples, computing device 202 may send local prediction model 256 to server 206 (e.g., as local prediction model 156) for further analysis and/or tuning of global prediction model 124.

FIG. 4 illustrates server 406 sending intermediate model 450, which may correspond to one or more of intermediate model 150, coarse intermediate model 152, and fine intermediate model 154, to computing device 402, which may correspond to computing device 202. Computing device 402 may use intermediate model 450 and local training data set 426, which may correspond to local training data set 226, to train local prediction model 456, which may correspond to local prediction model 256. Server 406 may independently continue to train global prediction model 424. Thus, computing device 402 may be able to use a fully trained prediction model (e.g., local prediction model 456) that has been trained using local training data set 426 without sending local training data set 426 to server 406. Server 406 may also fully train global prediction model 424 without significant interruption to accommodate for trial usage by computing device 402. In addition, computing device 402 may benefit from the training using training data 422A-B without requiring the computing resources of a full training process for a prediction model.

In some examples, server 206 may select one of multiple intermediate models, such as one of intermediate model 150, coarse intermediate model 152, and fine intermediate model 154, to provide to computing device 202. For instance, selecting module 108, as part of server 206, may select an appropriate intermediate model for sending to computing device 202. The selecting may be based on one or more factors, such as availability (e.g., which intermediate model is ready to send to reduce a wait time for computing device 202), file size, available bandwidth, sophistication of model (e.g., providing a less sophisticated model for trial use), computing resources and/or capabilities of computing device 202, etc.

In some examples, selecting module 108 may select the appropriate intermediate model based on a size of local training data set 226. Computing device 202 may indicate an expected size of local training data set 226 such that selecting module 108 may select from the intermediate models.

Turning to FIG. 5, FIG. 5 illustrates a small local training data set 526A and a large local training data set 526B. The size of large local training data set 526B may be greater than that of small local training data set 526A. For small local training data set 526A, coarse intermediate model 552 may be provided to train a local prediction model 556A. For large local training data set 526B, fine intermediate model 554 may be provided to train a local prediction model 556B.

As stated above, the various precursor states may correspond to various amounts of bias for training data 522. When data profiles of the local training data sets (e.g., small local training data set 526A and/or large local training data set 526B) resemble the data profile of training data 522 (e.g., by having similar patterns, events, and/or incidents of the computing event), the biasing may not negatively affect the efficacy of the local prediction models (e.g., local prediction model 556A and/or local prediction model 556B, respectively). However, the local training data sets may exhibit data profiles that differ from that of training data 522. For example, in the computer security context, the local training data sets may include previously unseen new families of threats and/or incidents. If the local prediction models are too biased toward training data 522, the predictive ability of the local prediction models with respect to the new families of incidents may be reduced.

To mitigate the reduced predictive ability, the intermediate model may be selected based on the size of the local training data set. For small local training data set 526A, an intermediate model that is less biased toward training data 522 (e.g., coarse intermediate model 552) may be selected and provided. Because of the small size of small local training data set 526A, the influence of small local training data set 526A may be insufficient to overcome a strong bias.

For large local training data set 526B, the greater influence of large local training data set 526B may offset a strong bias of the intermediate model (e.g., fine intermediate model 554). In some examples, because fine intermediate model 554 may be closer to the convergence state, less training may be required to fully train local prediction model 556B.

In some examples, server 206 may provide multiple intermediate models, such as two or more of intermediate model 150, coarse intermediate model 152, and fine intermediate model 154, to computing device 202. For example, computing device 202 may have multiple data sets for training multiple local prediction models, or alternatively computing device 202 may directly select from the multiple intermediate models as needed.

As explained above in connection with example method 300 in FIG. 3, an intermediate model may be created while training a global prediction model. For example, a cloud-based service for detecting malware may be able to scan and detect, in near real time, potential malware on customers' devices. The cloud-based service may use a global prediction model trained with the customers' data. During the training process, the cloud-based service may preserve training midpoints. These training midpoints may be provided to potential customers. A potential customer may be able to train, starting with a training midpoint, a local prediction model using local data. Because the potential customer may locally train a usable version of the prediction model, the potential customer may be able to test the cloud-based service without having to upload data for training. Thus, the machine-learning-based prediction model may be updated, with local data, while preserving privacy.

Although the systems and methods herein are described with respect to computer security, in other implementations, the prediction models and training described herein may be used in relation to other types of data analysis, including but not limited to computer vision, speech recognition, machine translation, content filtering, medical diagnosis, playing games, predicting recordable events, pattern recognition, decision making, etc.

Figure 6:
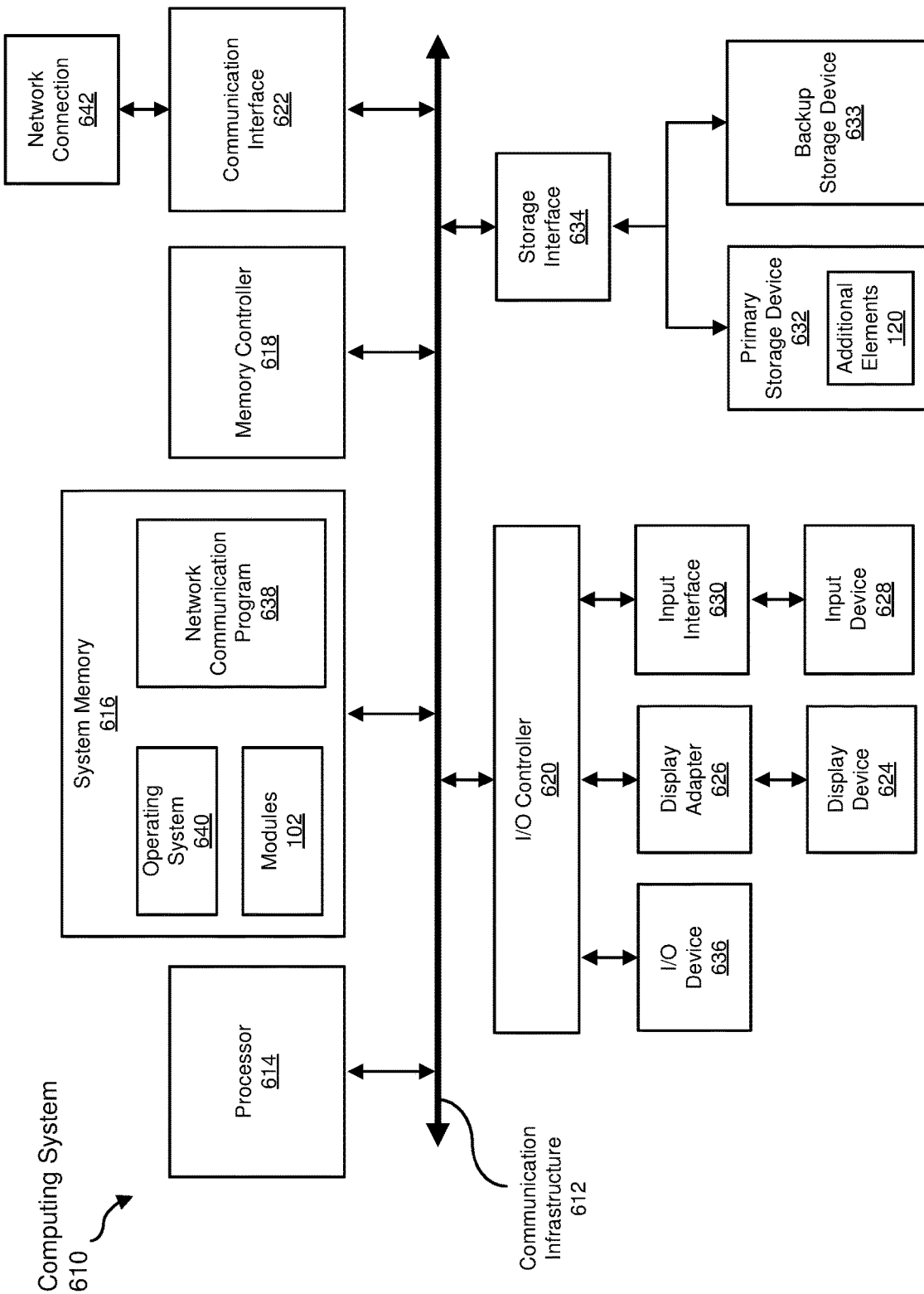
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
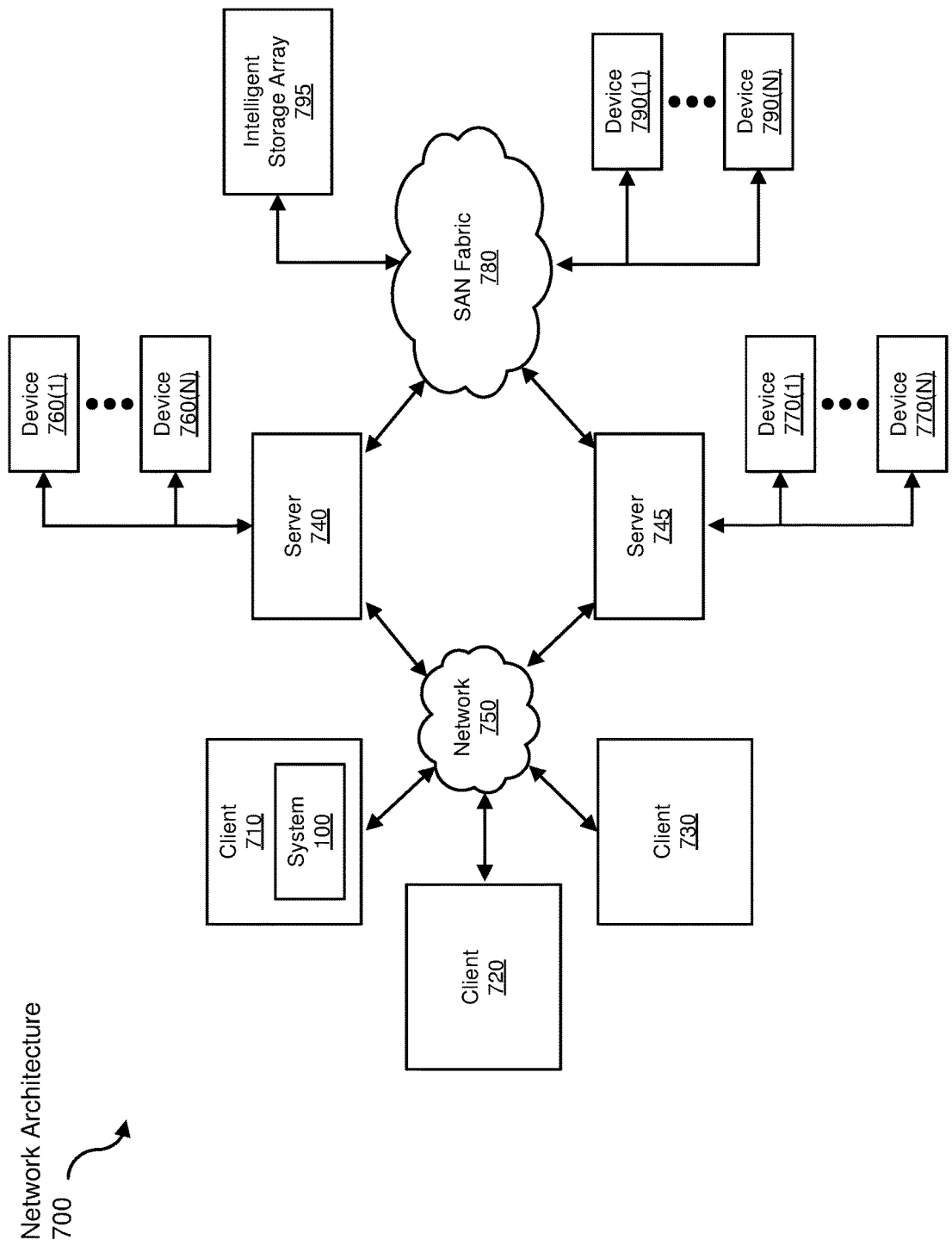
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for updating a machine-learning-based prediction model with preserved privacy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive training data to be transformed, transform the data, output a result of the transformation to train a prediction model, and store the result of the transformation to create prediction models. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for updating a machine-learning-based prediction model with preserved privacy, at least a portion of the method being performed by a computing device comprising at least one processor, the method comprising:

receiving a plurality of training data sets from a plurality of computing devices, with each data set including incidents of a computing event, for training a machine-learning-based global prediction model for predicting future incidents of the computing event;

creating, by training the global prediction model using the plurality of training data sets, a plurality of intermediate prediction models of the global prediction model, wherein each intermediate prediction model corresponds to a distinct precursor state associated with fully training the global prediction model, and wherein each distinct precursor state corresponds to a different training midpoint with a different amount of bias to the plurality of training data sets;

receiving, from a computing node, an expected size of a local training data set that is local to the computing node and that is separate from the plurality of training data sets, wherein the expected size of the local training data set is indicative of an influence of the local training data set for training;

selecting an intermediate prediction model from the plurality of intermediate prediction models based on correlating the expected size to the amount of bias of the selected intermediate prediction model to the plurality of training data sets to allow the influence of the local training data set to offset the bias of the selected intermediate model; and providing the selected intermediate prediction model to the computing node to enable the computing node to fully train a local prediction model using both the intermediate prediction model and the local training data set.

2. The computer-implemented method of claim 1, wherein fully training the global prediction model includes training the global prediction model until a model parameter reaches a convergence point such that the intermediate prediction model corresponds to the precursor state prior to the model parameter reaching the convergence point.

3. The computer-implemented method of claim 1, wherein the plurality of intermediate prediction models includes a coarse intermediate prediction model corresponding to a first precursor state of the global prediction model and a fine intermediate prediction model corresponding to a second precursor state of the global prediction model, wherein the first precursor state precedes the second precursor state.

4. The computer-implemented method of claim 3, wherein selecting the intermediate prediction model comprises selecting the coarse intermediate prediction model for a first local training data set and selecting the fine intermediate prediction model for a second local training data set, wherein the second local training data set is larger than the first local training data set.

5. The computer-implemented method of claim 1, further comprising providing the plurality of intermediate prediction models to the computing node.

6. The computer-implemented method of claim 1, wherein the plurality of intermediate prediction models correspond to stable prediction models.

7. The computer-implemented method of claim 1, wherein the computing event corresponds to a computer security threat.

8. The computer-implemented method of claim 1, wherein creating the plurality of intermediate prediction models comprises saving the distinct precursor states during a progression from an initial state of training to a convergence state of training corresponding a progression of coarser intermediate models to finer intermediate models.

9. The computer-implemented method of claim 8, wherein the progression of coarser intermediate models to finer intermediate models corresponds to a progression of increasing conformity to the plurality of training data sets.

10. The computer-implemented method of claim 9, wherein selecting the intermediate prediction model from the plurality of intermediate prediction models is further based on the selected intermediate prediction model having an amount of bias to the plurality of training data sets that can be offset by the influence of the local training data set corresponding to the expected size.

11. A system for updating a machine-learning-based prediction model with preserved privacy, the system comprising:
- at least one physical processor;
- physical memory comprising computer-executable instructions that, when executed by the physical processor, cause the physical processor to:
  - receive a plurality of training data sets from a plurality of computing devices, with each data set including incidents of a computing event, for training a machine-learning-based global prediction model for predicting future incidents of the computing event;
  - create, by training the global prediction model using the plurality of training data sets, a plurality of intermediate prediction models of the global prediction model, wherein each intermediate prediction model corresponds to a distinct precursor state associated with fully training the global prediction model, and wherein each distinct precursor state corresponds to a different training midpoint with a different amount of bias to the plurality of training data sets;
  - receive, from a computing node, an expected size of a local training data set for that is local to the computing node and that is separate from the plurality of training data sets, wherein the expected size of the local training data set is indicative of an influence of the local training data set for training;
  - select an intermediate prediction model from the plurality of intermediate prediction models based on correlating the expected size to the amount of bias of the selected intermediate prediction model to the plurality of training data sets to allow the influence of the local training data set to offset the bias of the selected intermediate model; and
  - provide the selected intermediate prediction model to the computing node to enable the computing node to fully train a local prediction model using both the intermediate prediction model and the local training data set.

12. The system of claim 11, wherein fully training the global prediction model includes training the global prediction model until a model parameter reaches a convergence point such that the intermediate prediction model corresponds to the precursor state prior to the model parameter reaching the convergence point.

13. The system of claim 11, further comprising providing the plurality of intermediate prediction models to the computing node.

14. The system of claim 11, wherein creating the plurality of intermediate prediction models comprises saving the distinct precursor states during a progression from an initial state of training to a convergence state of training corresponding a progression of coarser intermediate models to finer intermediate models.

15. The system of claim 14, wherein the progression of coarser intermediate models to finer intermediate models corresponds to a progression of increasing conformity to the plurality of training data sets.

16. The system of claim 15, wherein selecting the intermediate prediction model from the plurality of intermediate prediction models is further based on the selected intermediate prediction model having an amount of bias to the plurality of training data sets that can be offset by the influence of the local training data set corresponding to the expected size.

17. A non-transitory computer-readable medium comprising one or more computer-executable instructions that, when executed by at least one processor of a computing device, cause the computing device to:
- receive a plurality of training data sets from a plurality of computing devices, with each data set including incidents of a computing event, for training a machine-learning-based global prediction model for predicting future incidents of the computing event;
- create, by training the global prediction model using the plurality of training data sets, a plurality of intermediate prediction models of the global prediction model, wherein each intermediate prediction model corresponds to a distinct precursor state associated with fully training the global prediction model, and wherein each distinct precursor state corresponds to a different training midpoint with a different amount of bias to the plurality of training data sets;
- receive, from a computing node separate from the plurality of computing devices, an expected size of a local training data set that is local to the computing node and that is separate from the plurality of training data sets, wherein the expected size of the local training data set is indicative of an influence of the local training data set for training;
- select an intermediate prediction model from the plurality of intermediate prediction models based on correlating the expected size to the amount of bias of the selected intermediate prediction model to the plurality of training data sets to allow the influence of the local training data set to offset the bias of the selected intermediate model; and
- provide the selected intermediate prediction model to the computing node to enable the computing node to fully train a local prediction model using both the intermediate prediction model and the local training data set.

18. The non-transitory computer-readable medium of claim 17, wherein fully training the global prediction model includes training the global prediction model until a model parameter reaches a convergence point such that the intermediate prediction model corresponds to the precursor state prior to the model parameter reaching the convergence point.

19. The non-transitory computer-readable medium of claim 17, wherein the plurality of intermediate prediction models includes a coarse intermediate prediction model corresponding to a first precursor state of the global prediction model and a fine intermediate prediction model corresponding to a second precursor state of the global prediction model, wherein the first precursor state precedes the second precursor state.

20. The non-transitory computer-readable medium of claim 19, wherein selecting the intermediate prediction model comprises selecting the coarse intermediate prediction model for a first local training data set and selecting the fine intermediate prediction model for a second local training data set, wherein the second local training data set is larger than the first training data set.

* * * * *